March 6, 1956 W. A. BARNES 2,737,564
COMPOUND TIP WELDER TOOL
Filed Nov. 12, 1952 2 Sheets-Sheet 1
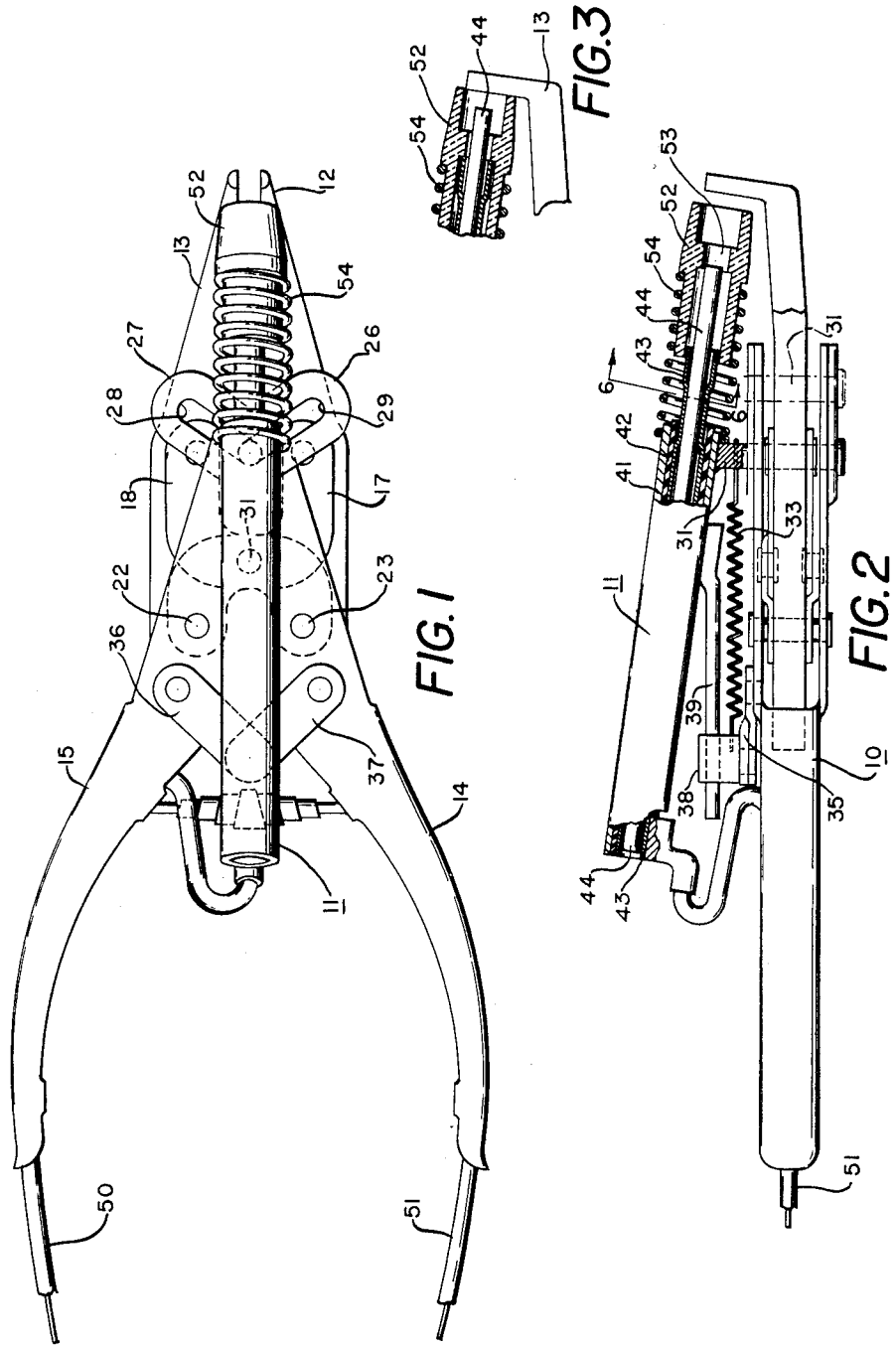
INVENTOR.
WILLIAM A. BARNES
BY Woodling and Krost
Attys

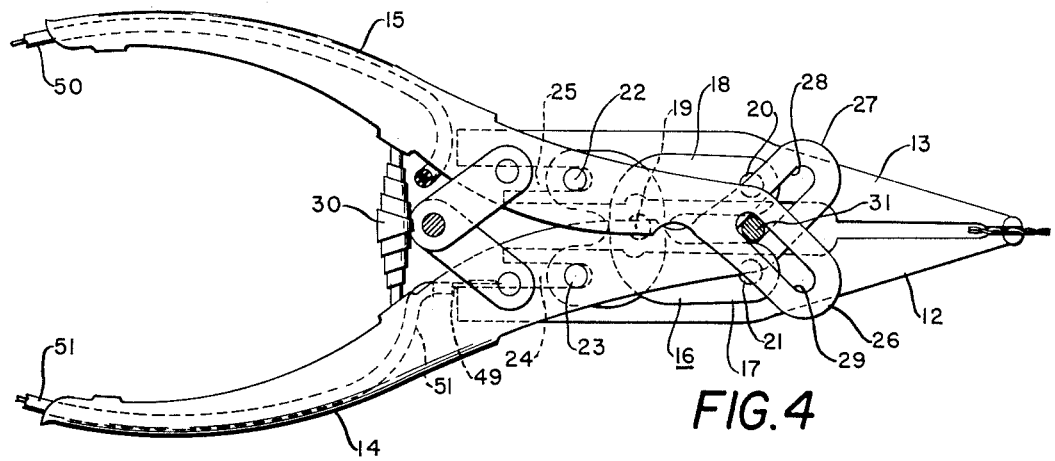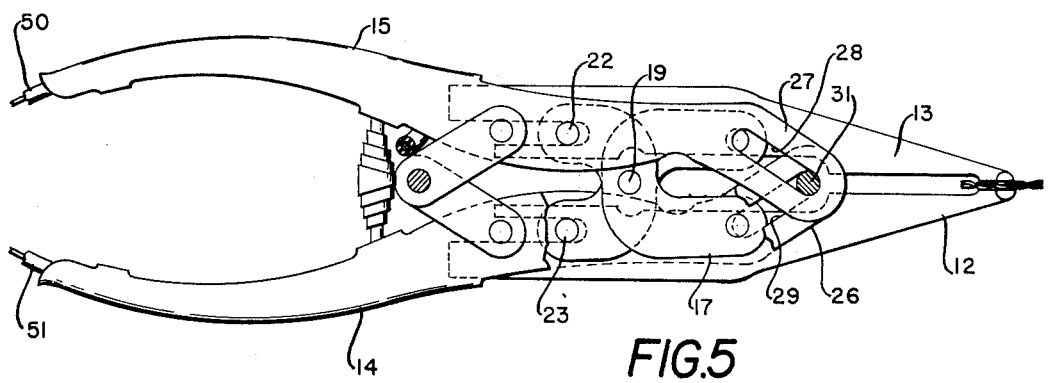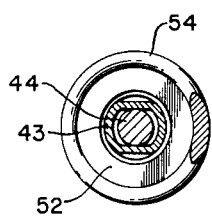

United States Patent Office 2,737,564
Patented Mar. 6, 1956

2,737,564

COMPOUND TIP WELDER TOOL

William A. Barnes, Utica, N. Y., assignor to Utica Drop Forge & Tool Corporation, a corporation of New York Application November 12, 1952, Serial No. 319,938

6 Claims. (Cl. 219—8)

This invention relates in general to electrical arc welding conducting members, and relates more specifically to the apparatus for successfully uniting such members with certain regularity.

An object of this invention is to provide an improved method of tip welding two conducting member together.

Another object of this invention is to provide for accurate control of welding energy applied to weld conducting members.

Another object of this invention is to provide improved apparatus for applying a correct amount of welding energy in the most advantageous manner.

Still another object of this invention is to adapt the welding method and principle to a practical portable tool for uniting members which cannot be brought to a fixed-position production machine.

And another object of this invention is to provide a portable tip welder tool having handle grips movable by hand grip pressure through a first range of movement to cause a workpiece gripping action, and thereafter continuing through a second range to cause an electrode to advance upon the workpiece.

Other objects and a fuller understanding of the invention may be had by reference to the following description and claims, taken in conjunction with the accompanying drawings, in which:

Figure 1 is a top plan view of a hand power portable tip welding tool embodying the principles of this invention;

Figure 2 is a side elevation, partially in section, of the tool of Figure 1;

Figure 3 is a partial view, showing the welding area only, similar to the corresponding portion of Figure 2, but with the electrode advanced to its forward limit and a weld completed;

Figure 4 is a top view of the plier-like work gripping and holding member alone, illustrated as if the mounting and driving members for the electrode means were severed and the electrode means removed, the parts being in a work gripping position with the handles at the end of the first range of closing action;

Figure 5 is the same view as Figure 4 with the handles closed through the second range of closing action, and with part of one handle extension broken away to illustrate the structure thereunder; and Figure 6 is a section taken along line 6—6 of Figure 2.

The electrical union of two or more conducting members has been essential since the first adoption of electricity to practical purposes. In some instances a simple mechanical union between the conducting members is satisfactory. Practically the only such union acceptable today is the attachment of a household lighting fixture to the supply circuit. The second, and practically universally accepted, method is to join electrical conducting members by soldering.

In recent years, however, aluminum has been widely adopted as an electrical conductor. It is well known that aluminum is difficult to unite or to join to other types of metal by a soldering or brazing process. In an effort to effectively unit aluminum wires or unite aluminum to other conducting metals, electrical welding of both the arc and resistance type have been resorted to.

The electrical arc welding of aluminum members, or of an aluminum member to other types of conducting members, has been only moderately successful because uniformity in the application of the welding energy has never been accomplished. A successful weld in one effort would not assure a continuous production of successful welds. Overheating or underheating, holding an arc for too long a period or too short a period, striking or extinguishing the arc too soon, and similar frailties have plagued the attempt to produce continuous tip welding unions.

According to this invention, the weldable members are held in close proximity and grounded. An electrode member of opposite polarity is then rapidly advanced toward the area of the conducting members to be united. Before the electrode member can reach the weldable members, an arc will jump btween the electrode and the weldable members and cause the weldable members to rapidly rise to the melting point and begin to melt. If the welding potential is sufficiently great, then melting will be rapid enough to cause the weldable members to melt into a ball and recede before the face of the advancing electrode. This receding action will be fast enough to increase the distance between the weldable members and the electrode member beyond the arcing distance and, consequently, will extinguish the arc. Formed conducted members will retract as they melt because a spherical form will contain more material for a given surface than the shaped article. Consequently, when the weldable members are supported in mid-air and caused to melt, they will form into a globule and, therefore, will recede from the electrode. Control of the application of the welding energy is thus achieved by permitting the weldable members to recede from the electrode and thereby break the arc after a sufficient quantity of the conducting members has melted to provide a good electrical union. In some cases, a very small globule of weld may be desirable. In that case, the electrode itself may be caused to recede after the arc is struck, to hasten the extinguishing of the arc, or the workpieces may be carried away from the electrode.

Although this invention was made with aluminum in mind, it has been found to operate with copper and other metals as well as, if not better than, aluminum.

The preferred embodiment of a hand power portable tip welding tool embodying the principles of this invention embodies generally a plier-like work gripping and holding member 10 and a longitudinally reciprocable electrode member 11 mounted together as a unitary structure.

The construction of the illustrated embodment of the tool can best be understood by considering the members 10 and 11 separately at first. Accordingly, in Figures 4 and 5 the plier-like work gripping member 10 is illustrated separately from the entire construction. Figures 4 and 5 are top views of the work gripping member 10 taken as if the electrode member 11 were severed from its mounting and lifted away from the work gripping member 10.

The work gripping member 10 is preferably made with jaws 12 and 13 powered for a substantially rectilinear type lateral movement by handles 14 and 15. It is possible to design a tool embodying the principles of this invention wherein the jaws have a swinging movement with respect to one another instead of rectilinear movement. The rectilinear type movement is believed to be preferable. The illustrated construction will not deliver a perfect rectilinear movement but one closely approaching thereto.

In order to produce the preferred movement, a linkage drive 16 is interconnected between the handles and jaws. Drive 16, in the illustrated embodiment, comprises a link 17 and a link 18 crossed and pivoted by means of a pivot 19. At first glance the drawings may seem to indicate that the links 17 and 18 are two U-shaped members, but closer examination will show that the links are actually somewhat S-curved. Straight link members can be used if desired. The two crossed links 17 and 18, when pivotally connected, present two spaced forward ends for attachment to the jaws and two spaced rearward ends for attachment to the handles. The forward ends are attached to the jaws 12 and 13 by means of pivots 20 and 21. Pivots 22 and 23 are carried by the handles 15 and 14 and connect to the two rearward ends of the linkage drive 16.

Whenever rectilinear jaw movement is desired, instead of pivoting the jaws together at their rear portion, the jaw 12 is provided with a slot 24 and the jaw 13 is provided with a slot 25. The slot 24 encompasses the pivot 23 and the slot 25 encompasses the pivot 22. Closing of the pivots 22 and 23 together with respect to one another will cause a lengthening of the linkage drive 16, and consequently the jaws 12 and 13 will be slightly advanced with respect to the handles, and consequently the longitudinal slots 24 and 25 will allow the closing of the linkage drive 16 and of the jaws 12 and 13 without binding.

The handle members 14 and 15 extend beyond the linkage drive 16 and end in forward end links 27 and 26 respectively. As illustrated best in Figures 4 and 5, these forward ends 26 and 27 are crossed over one another and are provided with internal longitudinal slots 28 and 29 which also cross one another. A vertically extending driven linkage member 31 passes through the slots 28 and 29 and projects upwardly from the work gripping member 10 to interconnect with the electrode member 11. However, in order to focus attention solely upon the work gripping member 10, the driven linkage member 31 will be considered apart from the function which it serves with respect to driving the electrode member 11. However, as will later be seen, there is a resilient force urging the linkage member 31 rearwardly with respect to the jaws at all times. The resilient force, of course, is yieldable and may be overcome with sufficient forward force.

A spring member 30 is positioned between the handles 14 and 15 and urges the handles to an open position at all times.

In the operation of the work gripping member 10, there are two ranges of closing movement for the handles 14 and 15, producing two separate and distinct functions. When the handles 14 and 15 are completely opened and relaxed, the jaws 12 and 13 are also completely open as illustrated in Figure 1 of the drawings. The spring 30 acting on the handles 14 and 15 spreads the pivots 22 and 23 apart and, consequently, opens the jaws 12 and 13. In Figure 4 of the drawings, however, the handles 14 and 15 are illustrated as having been closed through a first range of movement to bring the pivots 22 and 23 together and, consequently, close the pivots 20 and 21 together, with the result that the jaws 12 and 13 have moved rectilinearly toward one another in a gripping action. It does not matter whether there is a workpiece gripped between the jaws insofar as the second phase of operation of the work gripping member 10 is concerned. It matters only that at some position the jaws 12 and 13 can no longer close together, and consequently the pivots 22 and 23 can no longer close together.

During the first range of movement for the handles 14 and 15, these handles are pivoted above the driven linkage member 31 and act as a simple lever composed of two lever members pivoted at their ends. So long as the resistance to closing movement is light upon the pivots 22 and 23, there will be no tendency to shift the driven linkage member 31 against the resilient and yieldable force urging that linkage member rearwardly.

However, upon the jaws 12 and 13 reaching a closed position against one another or upon a gripped workpiece, the resistance to closing movement by the pivots 22 and 23 suddenly becomes infinite. Thereupon the pivots 22 and 23 no longer act only as drive transfer members between the handles and the jaws, but then become pivot points for the handle members respectively. Consequently, the handle members 14 and 15 at this position between the first range and second range of closing movement have three pivot points; the pivots 22 and 23 and the driven linkage member 31. In order to have further movement of the handles 14 and 15 through a second range of movement, one of the three pivots must yield. The driven linkage member 31 is resiliently held, whereas the pivots 22 and 23 have infinite resistance to the movement at this state, and consequently the crossed slots 28 and 29 will attempt to slide with respect to one another as the handles pivot about the pivots 22 and 23, and thus a driving force will be produced upon the linkage member 31 in a forward direction with respect to the jaws and thus drive the linkage member 31 against the resilient rearward urge.

It should be particularly noted at this time that the location of the driven linkage member 31 at the bottom portions of the two slots 28 and 29 is substantially identical in Figures 1 and 4, although the handles 14 and 15 have closed together through a first range of movement and the jaws have been moved together upon a workpiece.

Referring now to the electrode member 11, this member is illustrated as comprising a housing 41 with an insulating housing 42 therein and with an electrode holder 43 frictionally engaged within the insulating housing 42. An electrode member 44, preferably of carbon, is held by frictional engagement within the holder 43. The holder 43 is clamped between the ends thereof in order to produce a short area for frictional gripping of the electrode. The sectional view shown in Figure 6 illustrates the clamped portion for gripping of the electrode.

The housing 41 is brazed to the top of the driven linkage member 31. The rear portion of the housing 41 is supported and guided by a rear electrode support 35 comprising links 36 and 37 pivotally carried by the handles and joined together by a pivot carriage 38. A guide pin 39 is brazed to the under portion of the housing 41 and extends through a convenient passageway provided through the pivot carriage 38. Thus, as the handles 14 and 15 are opened and closed, the pivot carriage 38 will remain substantially centered between the handles; and as the housing 41 is advanced and retracted, the pin 39 can adjust itself relative to the carriage 38 and yet receive support therefrom. A coil spring 33 stressed between linkage member 31 and carriage 38 provides the resilient force holding the member 31 urged to a rearward direction.

Referring now to the combined action of the entire tool, it may be recalled that the work gripping member 10 first closes the jaws 12 and 13 upon a work member and thereafter produces an advanced force upon the driven linkage member 31. Therefore, there will be no movement of the electrode until after a workpiece is firmly gripped between the jaws 12 and 13. Thereafter by forcing the handles 14 and 15 through a second range of movement, the driven linkage member 31 is advanced in a forward direction, and consequently will carry the housing 41 with the electrode 44 therein in a forward direction with respect to the jaws. As best illustrated in Figure 2 of the drawings, the forward end of the jaws is preferably turned upwardly in order to grip weldable members which are projected toward the operator without requiring the operator to hold the tool in an uncomfortable position. The housing 41, therefore, is positioned with the longitudinal axis thereof pointed toward the upturned portion of the jaws. The electrode will therefore be advanced and retracted through a work cycle directed toward the upturned portion of the jaws.

As previously pointed out, the object of this improved tool is to provide a superior welding of the members and to provide a self-acting end to the welding operation by bringing the electrode to a stop and allowing the welding process to continue until the weldable workpieces recede far enough from the electrode to break the arc and thereby stop the welding process. The electrode 44 is limited in its forward movement in the illustrated embodiment of the invention by the length of the crossed slots 28 and 29. The driven linkage member 31 cannot advance further than the forward ends of these slots, as best illustrated in Figure 5. Thus, a definite forward stopping position is obtained.

It is preferable that the jaws 12 and 13 be made of good electrical conducting material, although it is entirely possible to make only the immediate work gripping area of the jaws electrically conducted. In the illustrated embodiment of the invention lead wires 50 and 51 are brought from a suitable source of electrical energy and are extended down the interior of the handles 14 and 15. Lead wire 50 is connected, as best illustrated in Figures 1 and 2, directly to the electrode, whereas the lead wire 51 is brought to a terminal 49. The jaw 12 will then conduct the welding current to the workpiece gripped in the jaws.

Because an electrical arc weld produces a bright flash which is detrimental to human eyes, as well as sparking which may cause painful burns, and further because the molten weld is benefited by exclusion of free access of air, a shield 52 is preferably provided to surround the welding area. The shield 52 is provided with a longitudinal bore 53 therethrough into which the electrode 44 may project. The shield 52 is held in operative position by a spring 54 carried on the end of the housing 41 and surrounding the shield 52. Thus, the spring 54 will yield when the shield 52 comes into contact with the upturned ends of the jaws and hold the shield in place until the arc is struck.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A portable tip welding tool comprising, first and second handle members closable together through a first closing range and a second closing range, first and second work-member holding jaws, first linkage means between the handle members and jaws providing closing movement of the jaws upon closing movement of the handles through said first range, electrode means, second linkage means between the handles and electrode means providing driving movement of said electrode means toward said jaws upon closing movement of the handles through said second closing range, and means limiting the movement of said electrode means toward said jaws to a predetermined maximum approach.

2. A portable tip welding tool comprising, first and second handle members, first and second work-member holding jaws, first linkage means between the handle members and jaws, said handle members pivotally engaging said first linkage means, electrode means, second linkage means between the handles and electrode means providing driving movement of said electrode means toward said jaws upon actuation thereof, said handle members pivotally engaging said second linkage means, resistance to operation of said first linkage means being relatively low until said jaws close in clamping action whereupon resistance to further movement of the first linkage means becomes infinite, resistance to operation of said second linkage means being greater than the resistance of the first linkage means prior to said resistance of the first linkage means becoming infinite, thereby forcing the handles to first pivot about the second linkage means and operate the first linkage means and thereafter pivot about the first linkage means and operate said second linkage means, and means limiting the movement of said electrode means toward said jaws to a predetermined maximum approach.

3. A portable compound action device comprising, first and second handle members, first operable work performing mechanism, first linkage means between the handle members and said first operable work performing mechanism, said handle members pivotally engaging said first linkage means, second operable work performing mechanism, second linkage means between the handles and said second operable work performing mechanism, said handle members pivotally engaging said second linkage means, resistance to operation of said first linkage means being relatively low at initial actuation of said first operable mechanism and increasing to an infinite value, resistance to operation of said second linkage means being greater than the resistance of the first linkage means prior to said resistance of the first linkage means becoming infinite, thereby forcing the handles to first pivot about the second linkage means and operate the first linkage means and thereafter pivot about the first linkage means and operate said second linkage means.

4. A portable tip welding tool comprising, first and second handle members, first and second separate jaw members, an electrode member movable through a work cycle path toward and away from said jaw members, jaw member drive linkage means, pivot means pivotally connecting said first and second handle members to said jaw drive linkage means, electrode drive linkage means, pivot means pivotally connecting said first and second handle members to said electrode drive means, said electrode drive linkage means resisting drive action with a greater force than said jaw drive linkage until the jaws are closed into a gripping position, said handles therefore being pivotal upon said electrode drive linkage during closing of said jaws and thereafter pivotal upon said jaw drive linkage to operate the electrode drive linkage.

5. A plier-like work gripping and holding member and a longitudinally reciprocable electrode member mounted together as a portable tip welding tool comprising, first and second electrically conductive jaw members, first and second separate handle members, linkage drive means interconnecting said jaw members and handle members, said linkage drive means including first and second crossed links pivotally interconnected intermediate the ends thereof to provide two spaced forward ends and two spaced rearward ends, first pivot means connecting one forward end to said first jaw member and the other forward end to said second jaw member, second pivot means connecting one rearward end to said first handle member and the other rearward end to said second handle member, electrode means having a longitudinally reciprocable electrode member, means mounting said work gripping member and electrode means with the electrode member directed toward the jaws, means limiting the approach of said electrode member to a predetermined relative position with respect to said jaws, said first and second handle members having forward end portions projecting beyond said linkage drive means, drive means coacting with said end projections and converting lateral relative movement of said end projections into a forward drive thrust upon said electrode member, resilient means urging said electrode member to a retracted position against the drive of said drive means, and means for impressing a voltage between said jaws and electrode member.

6. A plier-like work gripping and holding member and a longitudinally reciprocable electrode member mounted together as a portable tip welding tool comprising, first and second electrically conductive jaw members, first and second separate handle members, linkage drive means interconnecting said jaw members and handle members, said linkage drive means including first and second crossed links pivotally interconnected intermediate the ends thereof to provide two spaced forward ends and two spaced rearward ends, first pivot means connecting one forward end to said first jaw member and the other forward end to said second jaw member, second pivot means connecting one rearward end to said first handle member and the other rearward end to said second handle member, electrode means having a longitudinally reciprocable electrode member, means mounting said work gripping member and electrode means with the electrode member directed toward the jaws, means limiting the approach of said electrode member to a predetermined relative position with respect to said jaws, said first and second handle members having forward end portions projecting beyond said linkage drive means and crossing one another, a driven shuttle linkage engaging both said forward end portions and thereby advancing as the forward end portions move to uncross, said longitudinally reciprocable electrode member connected to and driven by said shuttle linkage, spring means urging said electrode member and shuttle linkage in a reverse direction requiring said forward end projections to cross, said handle members therefore having a common pivotal union at the shuttle linkage and individual pivotal mounting on the linkage drive means, resistance by said spring to movement of said shuttle carriage being greater than resistance to closing of said jaws until the jaws are closed into a gripping position, said handles therefore being pivotal upon said shuttle linkage during closing of said jaws and thereafter pivotal upon said second pivot means to operate the shuttle linkage.

References Cited in the file of this patent

UNITED STATES PATENTS

| | | |
|---|---|---|
| 1,897,606 | Cole et al. | Feb. 14, 1933 |
| 2,139,499 | Howie | Dec. 6, 1938 |
| 2,442,423 | Lomax | June 1, 1948 |